United States Patent
Murakawa et al.

(10) Patent No.: US 6,916,559 B2
(45) Date of Patent: Jul. 12, 2005

(54) CERAMIC MATERIAL RESISTANT TO HALOGEN PLASMA AND MEMBER UTILIZING THE SAME

(75) Inventors: Shunichi Murakawa, Kokubu (JP); Yumiko Itoh, Kokubu (JP); Hiroshi Aida, Kokubu (JP); Katsumi Nakamura, Gamo-gun (JP); Tetsuzi Hayasaki, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/198,675

(22) Filed: Jul. 17, 2002

(65) Prior Publication Data

US 2003/0049499 A1 Mar. 13, 2003

Related U.S. Application Data

(62) Division of application No. 09/031,401, filed on Feb. 26, 1998, now Pat. No. 6,447,937.

(30) Foreign Application Priority Data

| Feb. 26, 1997 | (JP) | 9-042604 |
| May 30, 1997 | (JP) | 9-142680 |
| Nov. 28, 1997 | (JP) | 9-328449 |
| Jan. 30, 1998 | (JP) | 10-018839 |

(51) Int. Cl.[7] ............... B32B 9/00; C04B 35/505
(52) U.S. Cl. ............ 428/697; 428/304.4; 428/332; 428/446; 428/699; 428/701; 428/702; 501/152; 501/153
(58) Field of Search .................. 501/152, 153, 501/154; 428/689, 697, 699, 701, 702, 304.1, 332

(56) References Cited

U.S. PATENT DOCUMENTS

3,588,573 A 6/1971 Chen et al. ............ 313/221
3,649,864 A * 3/1972 Willemsen ............ 313/622

(Continued)

FOREIGN PATENT DOCUMENTS

| JP | 02-017684 | 1/1990 |
| JP | 03-067057 | 6/1991 |

(Continued)

OTHER PUBLICATIONS

Partial Translation of: Taikabutsu 47 (3) 149–153 (1995).
Partial Translation of: Ceramic 30 (11), 999–1001 (1995).
Partial Translation of: VSU Process Device Handbook, Kogyochosakai, (Jun. 1990).
Communication of the American Ceramic Society C–168 (1993).

*Primary Examiner*—Stephen Stein
(74) *Attorney, Agent, or Firm*—Hogan & Hartson LLP

(57) ABSTRACT

A member used within a plasma processing apparatus and exposed to a plasma of a halogen gas such as $BCl_3$ or $Cl_2$ is formed from a sintered body of metals of Group IIIa of Periodic Table such as Y, La, Ce, Nd and Dy, and Al and/or Si, for example, $3Y_2O_3 \cdot 5Al_2O_3$, $2Y_2O_3 \cdot Al_2O_3$, $Y_2O_3 \cdot Al_2O_3$ or disilicate or monosilicate, and in particular, in this sintered body, the content of impurity metals of Group IIa of Periodic Table contained in the sintered body is controlled to be 0.15 wt % or more in total. Specifically, for this member, an yttrium-aluminum-garnet sintered body having a porosity of 3% or less and also having a surface roughness of 1 μm or less in center line average roughness Ra is utilized.

14 Claims, 5 Drawing Sheets

U.S. PATENT DOCUMENTS

| | | | |
|---|---|---|---|
| 4,550,088 A | 10/1985 | Park et al. | 501/135 |
| 4,841,195 A | 6/1989 | De With et al. | 313/636 |
| 5,011,803 A | 4/1991 | Park et al. | 501/136 |
| 5,306,895 A | 4/1994 | Ushikoshi et al. | 219/385 |
| 5,424,609 A * | 6/1995 | Geven et al. | 313/623 |
| 5,455,480 A * | 10/1995 | Bastian et al. | 313/285 |
| 5,637,237 A | 6/1997 | Oehrlein et al. | 216/67 |
| 5,810,635 A | 9/1998 | Heider et al. | 445/26 |
| 6,020,690 A | 2/2000 | Takeda et al. | 315/248 |
| 6,200,918 B1 | 3/2001 | Yanagitani et al. | 501/152 |
| 6,447,937 B1 * | 9/2002 | Murakawa et al. | 428/696 |

FOREIGN PATENT DOCUMENTS

| | | |
|---|---|---|
| JP | 403218963 A | 9/1991 |
| JP | 03-275561 | 12/1991 |
| JP | 04-233154 | 8/1992 |
| JP | 05-217946 | 8/1993 |
| JP | 05-251365 | 9/1993 |
| JP | 5-251365 | 9/1993 |
| JP | 06-166563 | 6/1994 |
| JP | 06-168704 | 6/1994 |
| JP | 06-196131 | 7/1994 |
| JP | 03-060138 | 8/1994 |
| JP | 07-021990 | 1/1995 |
| JP | 07-041359 | 2/1995 |
| JP | 07-103482 | 4/1995 |
| JP | 07-176524 | 7/1995 |
| JP | 07-278851 | 10/1995 |
| JP | 8-027566 | 1/1996 |
| JP | 08-037180 | 2/1996 |
| JP | 08-298099 | 11/1996 |
| JP | 08-311692 | 11/1996 |
| JP | 08-325054 | 12/1996 |
| JP | 08-337467 | 12/1996 |
| JP | 09-293774 | 11/1997 |

* cited by examiner

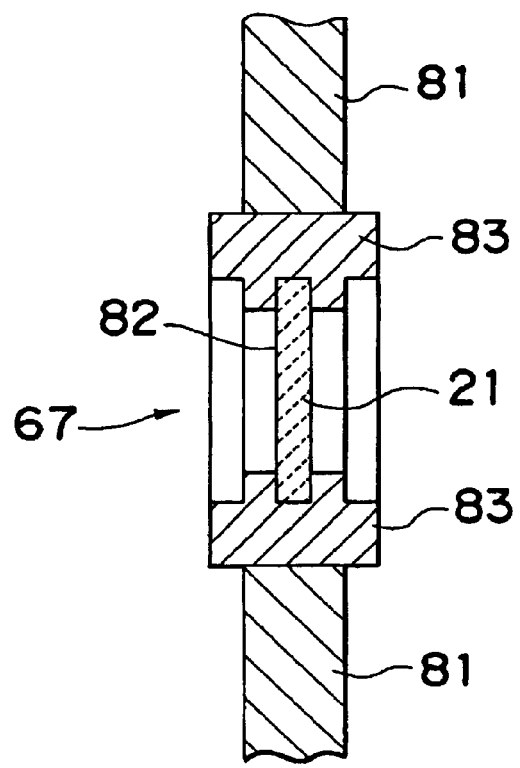
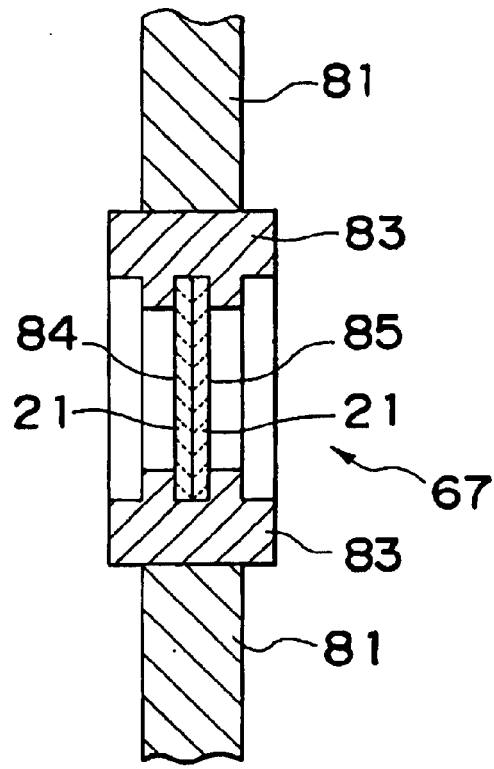

CERAMIC MATERIAL RESISTANT TO HALOGEN PLASMA AND MEMBER UTILIZING THE SAME

This is a divisional of application Ser. No. 09/031,401, now U.S. Pat. No. 6,447,937, filed Feb. 26, 1998, which application is hereby incorporated by reference in its entirety.

BACKGROUND OF THE INVENTION

1. Field of the Invention

The present invention relates to a corrosion-resisting ceramic material having high resistance to corrosive halogen-based gases and, more particularly, to a halogen-plasma resisting member in a plasma processing apparatus.

2. Prior Art

The halogen plasma technology is utilized in a semiconductor fabricating process, discharging tubes and lamps. The plasma in a corrosive halogen-based gas containing fluorine and/or chlorine, which has high reactivity, is utilized to facilitate growth from the gas phase, etching and cleaning during fabrication of a semiconductor device. Byway of example, a halogen plasma device includes a CVD device or a sputtering device for formation of a film on a semiconductor wafer, and an etching device for micro-fabrication of a semiconductor wafer.

Such members which are exposed within any of those devices are required to have a high resistance to corrosion because they are apt to contact the corrosive gas of a halogen or the plasma of such corrosive gas. Hitherto, those members are made of a $SiO_2$ material such as glass or quartz, and a corrosion-resisting metal such as stainless steel or monel metal is also used therefor.

The members made by the use of such a corrosion-resisting material may include, for example, an inner wall, a manhole, a microwave intake port and jigs which are utilized within the plasma processing apparatus used for the production of semiconductor devices and/or liquid crystals. Such members may include a discharging tube utilizing a halide gas and a discharge wall of a metal halide lamp other than the plasma processing apparatus.

As an exemplary device utilizing a plasma of a halogen gas, FIG. 6 illustrates a CVD device for forming the semiconductor wafer, including a microwave generating chamber 61 and a processing chamber 62 with a microwave introducing window 63 serving as a partition wall that separates the microwave generating chamber from the processing chamber. A coil 64 is disposed around an outer periphery of the processing chamber for forming an electromagnetic field. The processing chamber has a gas supply port 65 for the supply of a film forming gas, including a halogen gas, and an atmospheric gas, a gas discharge port 66 for the discharge of the gases, and an observatory window 67 for monitoring the inside.

In the processing chamber 62, there is provided an electrostatic chuck 70 for holding a semiconductor wafer 50. The electrostatic chuck includes a disc-shaped insulating base plate 71 having an electrode 73 embedded therein for sucking the wafer onto a support surface 72 of the base plate by the effect of an electrostatic force. A heater 74 is positioned below the base plate.

In this CVD device, the wafer is held by the electrostatic chuck in the processing chamber 62, in which the atmosphere is conditioned and microwaves from the microwave generating chamber 61 cooperate with the electromagnetic field, produced by the coil, to excite a film forming gas in the atmosphere so that a film forming gas plasma including a halogen gas can be generated to form a film on the wafer.

Within this type of the device for since the inner wall 68, the observatory window 67, the microwave introducing window 63 and the electrostatic chuck 70 are exposed to the highly corrosive plasma, they are formed of a corrosion-resisting material. For those members, a sintered body of alumina, sapphire or aluminum nitride AlN has hitherto been employed because of its excellent corrosion resistance (such as disclosed in, for example, the Japanese Patent Publication JP-A 5-251365), and members surface-coated with this material by the use of a CVD method are employed as well. In addition, for those members, a heater coated with graphite or boron nitride is also employed.

However, glass or quartz which have hitherto been used, exhibit an insufficient corrosion resistance in the plasma and are quick to wear. In particular, there has been a problem in that a contact surface when contacting a plasma of chlorine tends to be etched off, accompanied in change in surface property and that in the case of a member that requires a light transmissivity, the light transmissivity tends to be lowered as a result of the surface progressively fogged up. Even the members utilizing a metal such as stainless steel has so insufficient a corrosion resistance as to constitute a cause of occurrence of rejected products during the manufacture of semiconductor devices due to corrosion.

Also, even with the conventional sintered body of alumina, sapphire or aluminum nitride, the surface tends to be corroded in contact with the chloride plasma to such an extent that no separation of crystalline particles forming the surface can be avoided, and fine particles separated from the surface will stick to a support surface of the electrostatic chuck and the semiconductor wafer with the film forming accuracy consequently affected badly.

Moreover, inconveniences have been encountered that affected by a physical influence, brought about by, for example, light, heat and/or ions generated in the plasma within the device, and/or a chemical reaction with active species and the corrosive gas, a transparent windowpane for the windows is susceptible to progressive surface corrosion and consequent surface fogging to such an extent that observation of the interior of the device and analysis of the plasma will no longer be carried out. For this reason, a situation has arisen that there is no way other than to install the window material at a location distant from the plasma.

An alumina-coated glass material disclosed in the Japanese Laid-open Patent Publication No. 8-27566-A has been found having problems in that alumina itself has an insufficient resistance to corrosion brought about by the halogen plasma and that because of a difference in coefficient of thermal expansion between the alumina film and the glass base, not only does separation of the film tend to occur, but also the film is susceptible to cracking.

Particularly in the semiconductor manufacturing industry, with advance of the large scale integration of semiconductor integrated circuits, a high-density halogen plasma comes to be used widely and, because of the conventional window material having a relatively short lifetime, demands have arisen to make available a window material having high resistance to corrosion by the halogen plasma and also an excellent light transmissivity.

SUMMARY OF THE INVENTION

An object of the present invention is to provide a ceramic material having increased resistance to corrosion in a plasma of a corrosive halogen-based gas.

Another object of the present invention is to provide a member having increased resistance to corrosion in plasma of the corrosive halogen-based gas.

An further another object of the present invention is to provide a transparent member having increased resistance to corrosion in the plasma of the corrosive halogen-based gas.

A further another object of the present invention is to provide a member resistant to the halogen plasma, which can be employed in a plasma processing device utilizing the halogen plasma.

In order to accomplish these objects of the present invention, the ceramic material according to the present invention makes use of a composite oxide of metals comprising an element of Groupe IIa or IIIa in the Periodic Table and Al and/or Si.

The ceramic material made up of such a composite metal oxide forms a chloride of a high melting point on the surface thereof, as the reaction proceeds with a plasma of a corrosive chlorine based gas, the chloride developing into a stable chloride layer on the surface, thereby suppressing the progress of corrosion in the member. In this way, the ceramic material of the present invention can exhibit higher resistance to the halogen plasma than that exhibited by the conventional alumina or aluminum nitride. The ceramic material of the present invention makes it possible to provide at a relatively low cost a member capable of showing high corrosion resistance for a prolonged period of time even if it is used in the highly dense corrosive atmosphere rich of chlorine or fluorine.

The ceramic material may contain metallic impurities, other than the metal components used to form the composite metallic oxide, in a total amount of 0.1 wt % or less. Regulating the content of the metallic impurities is effective to avoid a possible separation of crystalline particles from the surface, which would otherwise occur as a result of corrosion attributable to impurities, while the member is exposed to the halogen plasma and, hence, to allow the ceramic material to exhibit a further resistance to corrosion. This is particularly effective to suppress possible occurrence of the contaminated semiconductor devices during manufacturing by use of the plasma processing apparatus.

The member resistant to the halogen plasma according to the present invention may be made of a sintered material of the composite metal oxide comprising the elements of Groupe IIa or IIIa in Periodic Table and Al and/or Si. The sintered material may be utilized to form a corrosion-resisting layer only on the surface portion of the member which is exposed to the halogen based plasma.

A member of the present invention is selected to be a sintered material of yttrium-aluminum-garnet (hereinafter referred to as "YAG") from among the composite metal oxides of an element of the Group IIIa in Periodic Table and aluminum and/or silicon, to be subsequently formed into a desired shape. In order that the member of the present invention has a surface with increased resistance to corrosion, low inner porosity and smoothness of the polish surface may be defined for the YAG sintered body. More specifically, the sintered body for the member of the present invention is defined such that a YAG sintered body has a porosity of 3% or less, and a center line surface roughness Ra of 1 μm or less, which is measured according to JIS B 0601.

furthermore the YAG sintered body of the member of the present invention may be defined to contain an oxide of a metal of Group IIa in Periodic Table and silicon oxide in a total amount of 0.15 wt % or less, this increasing an resistance of the member relative to corrosion due to the halogen-based gas plasma.

A transparent or light transmissive member of the present invention may be formed of a light transmissive YAG having a thickness within a range of 0.5 to 10.0 mm. This member may comprise a transparent substrate having a coated or sintered layer of YAG formed on one of surfaces which is exposed to the plasma. In such case, the coated or sintered layer may have a thickness in a range of 0.1 to 10.0 mm. The YAG sintered body is effective to allow the transparent member to retain the resistance to corrosion due to the halogen-based plasma and also to not reduce in transparency. The use of the member as a window material is effective to allow the window to function as a window due to the light transmissivity and also to avoid lowering of the light transmissivity which would otherwise occur as a result of the surface of the window material being corroded in contact with the plasma, thereby making it possible to prolong the lifetime of the window member.

These transparent or light transmissive members may be used for viewing windows for the plasma processing device and transparent envelopes forming a part of discharging tubes such as electric lamps.

Furthermore, the corrosion-resisting member of the present invention may include a MgO-containing ceramic sintered body comprising, on an oxide basis, MgO in a amount of 15 wt % or more and $Al_2O_3$ in a amount 85 wt % or less, since the MgO-containing ceramics has its high corrosion resistance to the plasma of the halogen gas. This ceramic material may comprise a ceramic sintered body comprising any of crystal phases of MgO, $MgAl_2O_4$ and MgO, $MgAl_2O_4$, and, $MgAl_2O_4$ and $Al_2O_3$, which have an average crystal grain size of 3 μm or more and a porosity of 0.2% or less.

BRIEF DESCRIPTION OF THE DRAWINGS

In the following detailed description of the invention, reference is made to the following drawings, in which:

FIG. 5A is a schematic sectional view of a window member for the plasma processing apparatus of the present invention, and FIG. 5B shows another example of a window member used in the plasma processing apparatus.

DETAILED DESCRIPTION OF THE INVENTION

Figure 1A:
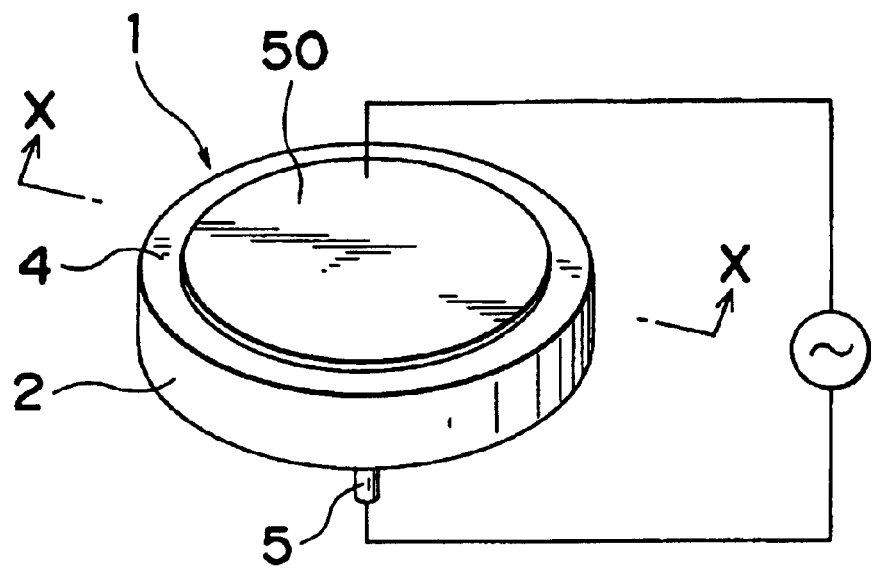
FIG. 1A is a perspective view of an electrostatic chuck employed in a plasma processing apparatus in connection with a preferred embodiment of the present invention.

The ceramic material resistant to a halogen plasma and the member using such a material according to the present invention are particularly utilized in the environment to be exposed the plasma of a halogen gas, the terms "resistance to the halogen plasma" is defined to be a resistance to corrosion caused by a halogen-containing gas that has been transformed into plasma. Such a halogen-containing gas includes chlorine-containing gas, such as $Cl_2$, $SiCl_4$, $BCl_3$ and HCl, and a fluorine-containg gas, such as $SF_6$, $CF_4$, $CHF_3$, $ClF_3$ and HF. Also included is a gas of a bromine system such as $Br_2$, HBr, $CBr_4$. When microwaves or high frequency waves are introduced into the atmosphere of any one of those gases, the gas is transformed into plasma.

The ceramic material of the present invention, although used to form a member or a portion thereof that is exposed to the plasma of the halogen containing gas, can be made of a ceramics comprising an composite oxide of metals including a metal of Group IIIa of Periodic Table and metal Al and/or Si. The metal of Group IIIa of Periodic Table which can be used to form the composite metal oxide includes Sc, Y, La, Ce, Nd, Sm Eu, Tb, Dy, Ho, Er, Tm Yb and Lu, any of which can be used in the present invention, but the use of any of Y, La, Ce, Nd and Dy is particularly preferred because of its low cost. It is to be noted that other than those metals, a crystal such as $Mg_3Y_2O_6$, $MgAl_2O_4$ or $LaAlO_3$ may be used.

The corrosion resistance of this composite metal oxide is largely dominated by the quantity of the metal of Group IIIa group of Periodic Table that is contained in the composite metal oxide and, accordingly, the amount of the metal of Group IIIa of Periodic Table used is 30 atm % or more, preferably 40 atm % or more, in the total amount of the metals contained in the composite metal oxide. As the amount of the metal of Group IIIa of Periodic Table is less than 30 atm %, initial corrosion takes place considerably on the surface in the halogen-containing gas and the plasma thereof, but it takes a relatively long time to form a protective layer progressively on a surface.

The ceramic material is of a kind in which the composite metal oxide includes, as a principal component, preferably a crystalline material containing at least two metallic elements of Group IIIa of Periodic Table, more preferably a garnet type crystal such as YAG ($3Y_2O_{30}.5Al_2O_3$), a monoclinic crystal such as YAM ($2Y_2O_3.Al_2O_3$), a perobuskite crystal such as YAP($Y_2O_3.Al_2O_3$), or a silicate compound such as monosilicate ($Y_2O_3SiO_2$), disilicate ($Y_2O_{30}.2SiO_2$). They are preferred because they have a high corrosion resistance. Of them, the use of the crystal of the garnet system or the crystal of the disilicate system is most preferred because of a high capability of being sintered and also because of the low manufacturing cost.

The ceramic material comprising the composite metal oxide referred to above preferably contains impurities of metals other than the metals forming the composite metal oxide in a amount of 0.15 wt % or less and more preferably 0.1 wt % or less. If the quantity of the metallic impurities is greater than 0.15 wt %, there is a high possibility that the metallic impurities will react with the plasma at a plasma radiating surface, accompanied by formation and evaporation or separation of a reaction product different from the surroundings. The consequence is that adverse effects such as reduction in corrosion resistance, deterioration of a surface property, separation of particles and so on will be brought on the material, specifically, the use of the metallic impurities in a quantity not greater than 0.05 wt % would hardly affect the corrosion resistance and the surface property. In particular, heavy metals (Fe, Cr, Ni and so on) and elements (Li, Na, K and soon) of an alkaline metal is liable to formation of the particles which eventually cause contamination and, therefore, for the semiconductor manufacture, the alkaline metal element should be used in a amount of 500 ppm or less and preferably 50 ppm or less.

The member of the present invention can be integrally formed from a sintered body of the ceramic material referred to above. The sintered body containing the composite metal oxide as a principal component can be produced by, for example, calcinating a powdery mixture of alumina ($Al_2O_3$) or silica ($SiO_2$) and an oxide of the metal of Group IIIa of Periodic Table at a temperature of 1100–1900° C. in an oxidizing or evacuated atmosphere. The calcinating method may be employed in the form of a hot-press method other than a low-pressure baking method.

The member of the present invention may not be limited to a sintered body, but may have a surface layer of the ceramic material formed thereon. Such a corrosion-resisting member may comprise a predetermined substrate having a surface formed with the ceramic layer by means of a known thin-film forming method such as a PVD or CVD method.

It may be the layer formed by applying a slurry, prepared by means of a known sol-gel method, and calcinating the applied slurry. The sintered body prepared by forming and calcinating the powder is most preferable of them because of a relatively wide range of applicability to all kinds of members.

It is noted that while the sintered layer of the composite metal oxide is formed on that portion which is exposed to the corrosive chlorine gas or its plasma, such sintered layer has a thickness preferably not smaller than at least 10 μm so that an excellent corrosion resistance can be imparted to the sintered layer. That is because if the thickness is less than 10 μm, no excellent corrosion resistance can be obtained.

Preferably, the corrosion-resisting member of the present invention may make use of an yttrium-aluminum-garnet (YAG) sintered body. This sintered body exhibits a high corrosion resistance to the plasma in the the halogen-containing gas atmosphere, and therefore, extremely suitable as a member used in such a plasma.

The halogen-containing gas exists in the form of halogen radicals dissociated in the plasma and, in the case of the conventional ceramics of an alumina-based or aluminum nitride-based ceramics, Al halide is formed on a surface thereof as a result of reaction with the radical. By way of example, for a chlorine-containing gas, since a chloride of Al tends to constantly sublimate with its high vapor pressure (10 torr at 124° C.) under a reduced pressure, the corrosion of the surface of the alumina-based ceramics continues while being exposed to the plasma. With the fluorine-containing gas, although radicals of the fluorine gas reacts on the alumia-based ceramics to form a stable protection film of aluminum fluoride, the corrosion advances due to radiant plasma energies.

In contrast thereto, the YAG sintered body is stable relative to the halogen radicals released in the plasma, hard to form a halide and exhibits a high resistance to the plasmized halogen gas.

Even with the YAG sintered body having such a high corrosion resistance, it has been found that the rate at which corrosion progresses tends to be affected dependently on the surface configuration. In other words, the smoother the surface of the sintered body is, the lower is the rate of surface corrosion.

For this reason, the YAG sintered body of the present invention is defined to have a porosity of 3% or less and a center line average roughness Ra of 1 μm or less. If the structure is densified by reducing the porosity, pores exposed open in the polished surface of the sintered body and fine projections from a peripheral rim of the pores are reduced and, similarly, the starting sites of corrosion reaction can be reduced. It is rendered to be a smooth surface of Ra 1 µm or less and fine projections are reduced from the surface and, similarly, the starting sites of the corrosion reaction are reduced. That is because if the porosity is higher than 3% or Ra is greater than 1 µm, the plasma energies will be concentrated on the surface projections and/or indents and corrosion will be accelerated.

The center line average roughness Ra is measured according to the method defined in JIS B 0601. The porosity is measured according to the Archimedes' principle.

YAG is defined to have a center composition of $3Y_2O_3 \cdot 5Al_2O_3$ and preferably contain $Y_2O_3$ in a amount in a range of 36.5 to 38.5 mol %, the balance being $Al_2O_3$.

YAG is a sintered body of yttria ($Y_2O_3$) and alumina ($Al_2O_3$) and, in the present invention, oxides of metal of Group IIa of Periodic Table, such as MgO or CaO, and silicon oxide ($SiO_2$) as impurities are preferably restricted to an amount of 0.15% or lree, and particularly 0.10% or less by weight. If the alkaline metal oxide and the silicon oxide exceed 0.15%, the surface corrosion will be accelerated in the plasma of the halogen gas.

The method of producing the YAG sintered body comprises mixing yttria ($Y_2O_3$) and alumina ($Al_2O_3$) in the above described proportions, calcinating the mixture to form an YAG crystal, and pulverizing the YAG crystal to provide a YAG powder. The resultant YAG powder is subsequently wet-milled and mixed with a dispersant and water to provide a YAG slurry.

During this calcination process the powdery mixture of yttria ($Y_2O_3$) and alumina ($Al_2O_3$) mixed in the previously described proportions has been calcinated at 1,000 to 1,600° C., and thereafter the resulting calcinated product is pulverized again to provide a YAG powered raw material having an average particle size within the range of 0.6 to 1.2 µm and a BET specific surface area of 2 to 5 m²/g. The purity of YAG is not lower than 99.5% and preferably not lower than 99.9%, and the amount of the harmful impurities of MgO, CaO and $SiO_2$ is restricted to a content of 0.15% or less, as described above.

The YAG slurry is formed into a molded body by pouring into a mold or injection molding method, or by forming tapes with the use of a doctor blade, a pull-up method, a calendaring method, a casting method, a paper casting method or a roll compacting method. The YAG slurry may also be formed by spraying with a dryer into granules, which are pressed between the dies or isostaticly pressed using a rubber press to produce a compact. Thereafter, the compressed compact is machined to a desired shape.

The YAG compact is, after having been preliminary fired for 2 hours at 800 to 1,400° C., heated and fired for several hours at a higher temperature within the range 1700 to 1850° C. within a vacuum furnace evacuated to $10^{-4}$ to $10^{-7}$ torr. In this way, the porosity of the YAG sintered body which is 3% or less can be attained. During this baking process, the capability of being sintered will be insufficient if the temperature is lower than 1700° C., and the crystal grain growth in the sintered body will be produced with the temperature higher than 1850° C., and therefore, in either case, the porosity of not higher than 3% cannot be attained.

In order to further densify the YAG sintered body, it is possible to obtain the sintered body having a porosity of substantially 0% by using hot isostatic pressing capable of sintering in the inert gas atmosphere at 2,000 atm.

This sintered body is then processed in such a way that that surface thereof which will be exposed to the plasma is ground to exhibit a center line average roughness Ra of not greater than 1 µm.

With respect to the magnesia-containing ceramic material and the corrosion-resisting member, the magnesia-containing ceramic material is formed of the single phase of MgO, the mixed phases of $MgAl_2O_4$ and MgO, the single phase of $MgAl_2O_4$, or the mixed phases of $MgAl_2O_4$ and $Al_2O_3$. MgO and $MgAl_2O_4$ contained in the magnesia-containing ceramic material does, when reacted in the halogen plasma, result in formation of $MgF_2$ of a high melting point (1,260° C.) reacting to fluorine, or a stable $MgCl_2$ of a similarly high melting point (714° C.) reacting to chlorine, and produce stable heat resistance even when exposed to the plasma at a high temperature and, therefore, they can be present stable on the surface, thereby preventing further corrosion.

$MgAl_2O_4$ phase is a compound into which MgO and $Al_2O_3$ are bonded in a stoichiometric ratio of 1:1 by mole (28.6:71.4 by weight). In the case of changing of the component ratio of MgO and $Al_2O_3$, the content of MgO greater than the stoichiometric ratio will result in a double phase structure of $MgAl_2O_4$ and MgO, and the content of $Al_2O_3$ greater than the stoichiometric ratio will result in a double phase structure of $MgAl_2O_4$ and $Al_2O_3$.

This kind of the ceramic material can exhibit a stable corrosion resistance due to the above described crystalline phase if it contains MgO and $Al_2O_3$ in respective contents of 15 wt % or more and 85 wt % or less, respectively in the terms of oxide. If the content of MgO is less than 15 wt %, the content of the $Al_2O_3$ phase will be excessive enough to lower the resistance to the halogen plasma.

In order to increase the corrosion resistance of the sintered body, it is important that the crystal grains are coarse with minimized grain boundary area and, for this purpose, the average crystal grain size of each crystal phase of $MgAl_24$, MgO and $Al_2O_3$ forming the sintered body is chosen to be not smaller than 3 µm. Preferably, the average crystal grain size is not smaller than 15 µm.

In order to increase the corrosion resistance of the sintered body, it is important to minimize the porosity. This is because edges around pores open on the surface are susceptible to corrosion by the plasma and, for this purpose, the porosity of the sintered body is chosen to be 0.2% or less. If the porosity is higher than 0.2%, the surface corrosion will be accelerated. In particular, if the average grain size of the crystal is smaller than 3 µm, it is difficult to attain the porosity of lower than 0.2% and, therefore, the sintered body is easy to be corroded.

The porosity of the ceramic sintered body is measured by the Archimedes' principle and the crystalline phase can be determined by an X-ray diffraction method.

The average crystal grain size is represented by the average grain size of the crystals in the case of the MgO single phase and $MgAl_2O_4$ single phase, but in the case of the double phase region by the average crystal grain size including the two phases. The average crystal grain size can be determined from a distribution of grain sizes by means of an image analysis of sectional structures of a sample and the line segment method can be conveniently used to determine it. The average grain size is a value obtained by setting an arbitrarily chosen number of, for example, 10, line segments on a microphotograph of the crystal and dividing the length of the line segment by the number of the crystal grains within the line segment. The average grain size can be obtain by averaging the total mean grain sizes determined by the 10 line segments.

With respect to the impurities of the sintered body, the amount of such impurities as $SiO_2$, CaO, $Na_2O$, $Fe_2O_3$, etc. and so on is chosen to be 1 part or less by weight relative to 100 parts by weight of the total weight of $Al_2O_3$ and MgO. The impurities in excess of 1 part by weight will produce a reduction in corrosion resistance.

Furthermore, the ceramic material and the member of the present invention include a ceramics having an increased corrosion resistance to the halogen plasma which is obtained by forming a metallic compound phase containing at least one of metals of Groups IIa and IIIa of Periodic Table, Cr, Co and Ni in the boundaries of the major crystalline phase of the ceramic sintered body.

The ceramic body is applied as far as the major crystalline phase thereof includes the MgO phase, the $MgAl_2O_4$ phase of a spinel structure described previously, the $Al_2O_3$ phase in the presence thereof, and the $Y_3Al_5O_2$ phase of a garnet structure discussed previously.

The grain boundary, having its high vapor pressure, is generally more instable than the grains, which is easy to be corroded and is high in corrosion rate under the corrosive atmosphere, and tends to cause principal crystalline particles to separate and scatter as exposed to the halogen plasma as discussed above. In contrast thereto, the aforesaid materials for forming the grain boundary phase according to the present invention can exhibit an excellent corrosion resistance owing to the major crystal grains with the corrosion of the grain boundary phase being suppressed relative to the halogen plasma and, therefore, the ceramics as a whole can exhibit a high corrosion resistance.

The metallic compound phase forming the grain boundary is a metallic compound including at least one of metals of Groups IIa and IIIa of Periodic Table, Cr, Co and Ni, which may be either crystalline or glassy.

The metallic compound phase forming such grain boundary phase is preferably applied to the YAG sintered body for the previously discussed halogen plasma member and a magnesia-containing sintered body or the like.

Embodiment 1

In this embodiment, the corrosion resistance of the ceramic material of the present invention made up of the composite metal oxide was tested.

Using various oxide powders, samples listed in Table 1 were prepared. Referring to Table 1, Samples 1 to 5 were prepared by melting a mixture of oxides of the metals of Group IIIa of Periodic Table and $SiO_2$ and/or $Al_2O_3$ at 2,000° C. and quenching it to vitrify. Samples 6 to 9 were prepared by firing the compacts mixed of $Y_2O_3$ or $Yb_2O_3$ and $SiO_2$ in respective predetermined proportions, at 1,300 to 1,600° C. Samples. 10 to 15 were prepared from the compacts of mixtures of $Y_2O_3$ and $Al_2O_3$ which were fired in the oxidizing or vacuum atmosphere at 1,600 to 1,900° C. Samples 16 to 18 were prepared from the compact of mixture of $Al_2O_3$ and the metal oxide of Group IIIa of the Periodic Table which were fired at 1,400 to 1,750° C. Samples 19 and 20 were prepared by vapor depositing $Sc_2O_3$ or $La_2O_3$ and $Al_2O_3$ on a targets with the use of a sputtering technique.

The samples shown in Table 2 are those in which with respect to the materials used in Samples 8, 10, 12, 14 and 17 raw materials were purified or added with impurities to form the associated sintered bodies. It is to be noted any of the sintered bodies were densified to a relative density of 95% or more.

The various materials in Table 1 were disposed inside an RIE plasma etching apparatus in which by introducing either a $BCl_3$ gas or a mixed gas of Ar and $Cl_2$ (the mole ratio of Ar to $Cl_2$ was 2 to 3), a high frequency of 13.56 MHz was introduced to generate a plasma. The materials were retained for 3 hours at maximum in this plasma, and the respective weights of the materials that had been reduced before and after the processing were measured, which weights were used to determine the thickness which has been corroded for one minute (Etching Speed(angstrom/min)). The surface configuration of each of the samples after the test was also observed, the result being shown in Table 1.

For comparison purpose, similar tests were conducted to the conventional BN sintered body, quarts glass, an alumina and aluminum nitride sintered bodies.

In Table 2, etching speeds and change in surface condition, both similar to those in Table 1, are listed with respect to the materials containing a varying amount of the impurities.

TABLE 1

| Sample No. | Material | Sample Morph. | Etching Gas | Etching Rate Å/min | Surface Condition | Impurity Amt. (ppm) | Evaluation |
|---|---|---|---|---|---|---|---|
| 1 | $Y_2O_3 \cdot SiO_2$ | Glass | $BCl_3$ | 89 | Slightly hazy | 300 | ◯ |
| 2 | " | " | $Cl_2$ + Ar | 80 | Slightly hazy | 400 | ◯ |
| 3 | $2Y_2O_3 \cdot SiO_2$ | Glass | $BCl_3$ | 76 | Slightly hazy | 380 | ◯ |
| 4 | $Nd_2O_3 \cdot SiO_2 \cdot Al_2O_3$ | Glass | $BCl_3$ | 69 | Slightly hazy | 400 | ◯ |
| 5 | $Dy_2O_3 \cdot SiO_2 \cdot Al_2O_3$ | Glass | $BCl_3$ | 72 | Slightly hazy | 450 | ◯ |
| 6 | $Y_2O_3 \cdot SiO_2$ | Sintered body | $BCl_3$ | 77 | No change | 300 | ◉ |
| 7 | $2Y_2O_3 \cdot SiO_2$ | Sintered body | $BCl_3$ | 68 | No change | 290 | ◉ |
| 8 | $Yb_2O_3 \cdot SiO_2$ | Sintered body | $BCl_3$ | 79 | No change | 220 | ◉ |
| 9 | " | " | $Cl_2$ + Ar | 62 | No change | 220 | ◉ |
| 10 | $YAlO_3$ (YAP) | Sintered body | $BCl_3$ | 50 | No change | 240 | ◉ |
| 11 | " | " | $Cl_2$ + Ar | 33 | No change | 240 | ◉ |
| 12 | $Y_3Al_5O_{12}$ (YAG) | Sintered body | $BCl_3$ | 53 | No change | 210 | ◉ |
| 13 | " | " | $Cl_2$ + Ar | 35 | No change | 210 | ◉ |
| 14 | $Y_4Al_2O_9$ (YAM) | Sintered body | $BCl_3$ | 48 | No change | 290 | ◉ |
| 15 | " | " | $Cl_2$ + Ar | 29 | No change | 290 | ◉ |
| 16 | $Dy_4Al_2O_9$ | Sintered body | $BCl_3$ | 53 | No change | 300 | ◉ |
| 17 | $Yb_3Al_5O_{12}$ | Sintered body | $BCl_3$ | 47 | No change | 210 | ◉ |
| 18 | " | " | $Cl_2$ + Ar | 31 | No change | 210 | ◉ |
| 19 | $2SC_2O_3 \cdot 3Al_2O_3$ | PVD | $BCl_3$ | 27 | No change | — | ◉ |
| 20 | $La_2O_3 \cdot 2Al_2O_3$ | PVD | $BCl_3$ | 32 | No change | — | ◉ |

TABLE 1-continued

| Sample No. | Material | Sample Morph. | Etching Gas | Etching Rate Å/min | Surface Condition | Impurity Amt. (ppm) | Evaluation |
|---|---|---|---|---|---|---|---|
| *21 | BN | Sintered body | BCl₃ | 450 | White hazy | 460 | X |
| *22 | Quartz (SiO₂) | Sintered body | BCl₃ | 570 | Clouded | — | X |
| *23 | " | " | Cl₂ + Ar | 610 | Clouded | — | X |
| *24 | Al₂O₃ | Sintered body | BCl₃ | 260 | Indentations | 150 | X |
| *25 | " | " | Cl₂ + Ar | 180 | Indentations | 150 | X |
| *26 | AlN | Sintered body | BCl₃ | 920 | Hazy | 380 | X |
| *27 | " | " | Cl₂ + Ar | 740 | Hazy | 380 | X |

The sample number with the symbol (*) is out of the claim of the present invention.

TABLE 2

| Sample No. | Material | Sample Morph. | Etching Gas | Etching Rate Å/min | Surface Condition | Impurity Amt. (ppm) | Evaluation |
|---|---|---|---|---|---|---|---|
| 28 | Yb₂O₃·SiO₂ | Sintered body | BCl₃ | 73 | No change | 50 | ⊚ |
| 29 | " | " | " | 75 | No change | 300 | ⊚ |
| 30 | " | " | " | 80 | Slightly hazy | 800 | ○ |
| 31 | " | " | " | 83 | Protuberances | 1200 | Δ |
| 32 | YAlO₃ (YAP) | Sintered body | BCl₃ | 46 | No change | 100 | ⊚ |
| 33 | " | " | " | 51 | No change | 450 | ⊚ |
| 34 | " | " | " | 50 | Slightly hazy | 900 | ○ |
| 35 | " | " | " | 57 | Protuberances | 1500 | Δ |
| 36 | Y₃Al₅O₁₂ (YAG) | Sintered body | BCl₃ | 46 | No change | 50 | ⊚ |
| 37 | " | " | " | 48 | No change | 400 | ⊚ |
| 38 | " | " | " | 52 | Slightly hazy | 900 | ○ |
| 39 | " | " | " | 63 | Indented | 1100 | Δ |
| 40 | Y₄Al₂O₉ (YAM) | Sintered body | BCl₃ | 44 | No change | 150 | ⊚ |
| 41 | " | " | " | 46 | No change | 350 | ⊚ |
| 42 | " | " | " | 48 | Slightly hazy | 850 | ○ |
| 43 | " | " | " | 55 | Indented | 1700 | Δ |
| 44 | Yb₃Al₅O₁₂ | Sintered body | BCl₃ | 45 | No change | 200 | ⊚ |
| 45 | " | " | " | 49 | No change | 450 | ⊚ |
| 46 | " | " | " | 52 | Slightly hazy | 750 | ○ |
| 47 | " | " | " | 56 | Indented | 1300 | Δ |

As shown in Table 1, the conventional materials exhibited the etching speed in excess of 200 angstrom/min and also the considerably rough surfaces. Even in the Al₂O₃ and the AlN sintered bodies, a multiplicity of indentations or asperities brought about by the etching were observed.

In contrast to those comparisons, the samples according to the present invention identified by Nos. 1 to 20 have shown a high corrosion resistance to the chlorine plasma. In particular, although a slight haze was found on the sample surface in the form of glass, all of the samples in the form of a sintered body and a thin film have exhibited the good surface condition. With respect to the samples other than those specified, it was observed that the surface property changed accompanied by indentations and protuberances. Also, it has been ascertained that in all of the samples according to the present invention, a chloride layer rich of the metal of Group IIIa of Periodic Table have been formed on the surface after the test.

Also, as shown in Table 2, in each of the materials, it has been found that increase of the amount of the impurity has resulted in a slight increase of the etching speed. Observing the surface condition, although each of Samples Nos. 31, 35, 39, 43 and 47 containing the impurity in excess of 1,000 ppm has shown a low etching speed, the presence of protuberances and indentations on the surface was observed with naked eyes. Also, each of Samples No. 30, 24, 38, 42 and 46 containing the impurity in a quantity smaller than the restricted value, but in excess of 500 ppm was found having been hazed slightly. Other samples containing the impurity in a amount greater than the restricted value have shown that the protuberances appearing on the sample surface contained impurity elements in a quantity greater than that found in the other samples. It appears that once separation of the protuberances would leaf surface indentations.

As describes above, according to the present invention, if the member that can be exposed to a corrosive chlorine gas and its plasma of is made of the composite metal oxides of the metal of Group IIIa of Periodic Table and Al and/or Si with the total amount of the impurities controlled to 0.1 wt % or less so that the chloride layer capable of exhibiting at least a stable material surface can be formed, it can attain a high corrosion resistance in the severe corrosive atmosphere rich of chlorine. Moreover, since the sintered body can easily be formed, it can be applied in molding in any desired shape.

Embodiment 2

In this embodiment, specific examples of the plasma-resistant members are directed to a member used in the plasma processing apparatus for use in manufacture of semiconductor devices.

Figure 1B:
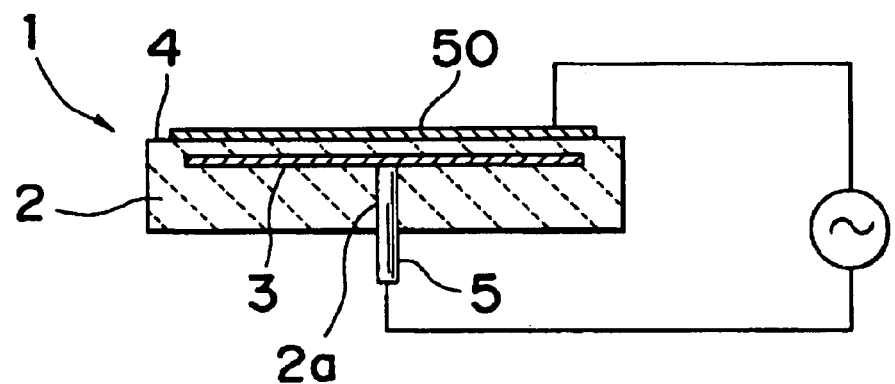
FIG. 1B is a sectional view of the electrostatic chuck shown in FIG. 1A.

As a first example of use of the plasma-resistant member of the present invention, FIG. 1A illustrates an outer appearance of an electrostatic chuck and FIG. 1B illustrates a section of the electrostatic chuck. The electrostatic chuck is in the form of a plate-like body 2 prepared from the YAG sintered body of the present invention, and the plate-like body 2 has a suction electrode 3 embedded therein and has an upper surface serving as a support surface 4, an under-surface of said plate-like body 2 having a power supply end extending therethrough for connection with the suction electrode 3.

The YAG sintered body has a porosity not higher than 3% and the support surface 4 at the upper surface of the plate-like body 2 after having been formed is precisely machined to the center average roughness Ra of 0.8 μm. Other surfaces than the support surface 4 are machined to the center average roughness Ra of not higher than 1.0 μm.

With this electrostatic chuck, a semiconductor wafer 50 is placed on the support surface 4 and the wafer 50 is sucked and retained thereon by applying an electrostatic voltage between the wafer 50 and the suction electrode 3. At this time, for this suction, at a normal temperature range a Coulomb's force is developed as an electrostatic suction force by dielectric polarization, and at a high temperature range a Johnson-Rahbek force brought about by a small leak current is utilized.

Since the plate-like body 2 is made from the YAG sintered body having the porosity of not higher than 3% and having the surface of which Ra is not greater than 1 μm, corrosion of the surface of the electrostatic chuck is minimized and, hence, contamination of the wafer 50 by particles can be reduced.

Figure 2A:
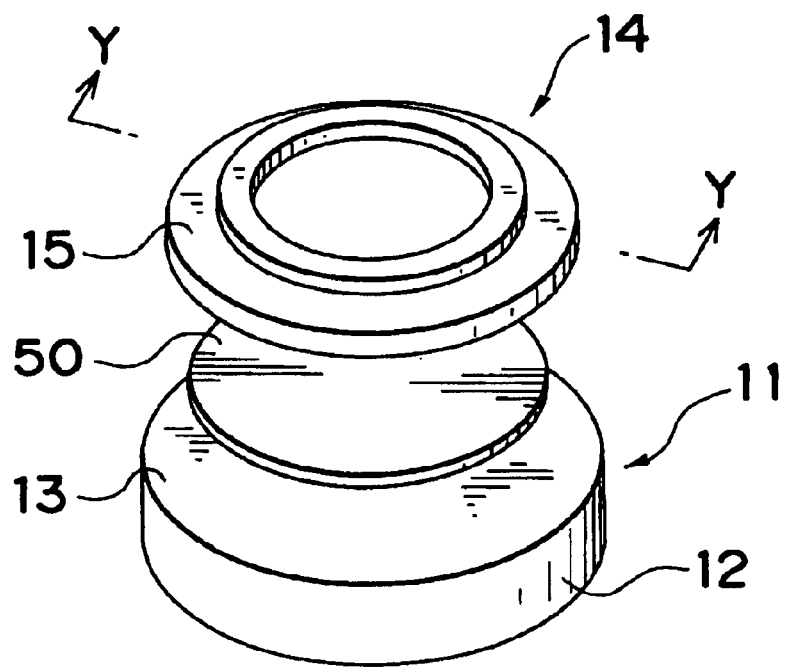
FIG. 2A is a perspective view of a susceptor and a clamp member both used in the plasma processing apparatus in connection with a preferred embodiment of the present invention.
Figure 2B:
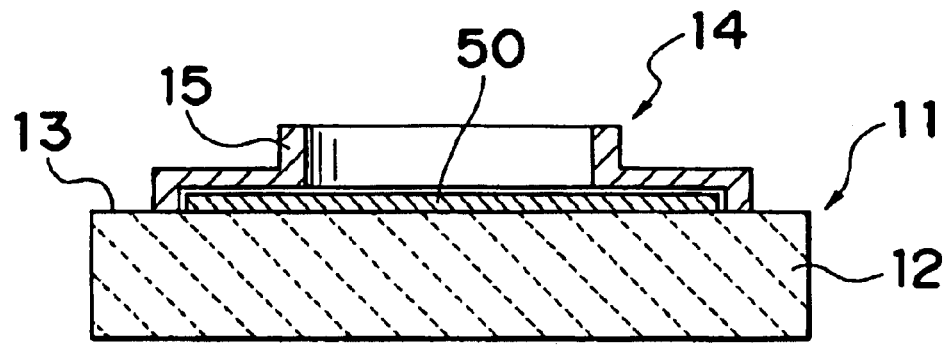
FIG. 2B is a sectional view of the susceptor and the clamp member both shown in FIG. 2A.

As a second example of use of the plasma-resisting member of the present invention, a susceptor and a clamp member such as shown in FIGS. 2A and 2B, respectively, are exemplified. The susceptor 11 is in the form of a disc-shaped plate body 12 and is formed from the YAG sintered body of the present invention.

A support surface 13 of the susceptor 11 has a clamp member 14 placed thereon for holding a peripheral edge portion of the semiconductor wafer 50.

Both of the susceptor 11 and the clamp member 14 are made from the YAG sintered body having the porosity of not higher than 3%, the support surface 14 of the susceptor 11 is machined to the center line average roughness Ra of not greater than 0.8 m by means of a precise grinding, and the clamp member 14 is in the form of a ring-shaped molded body of the above described YAG sintered body, the surface of which is machined to the center line average roughness Ra of not greater than 1.0 μm.

Figure 3:
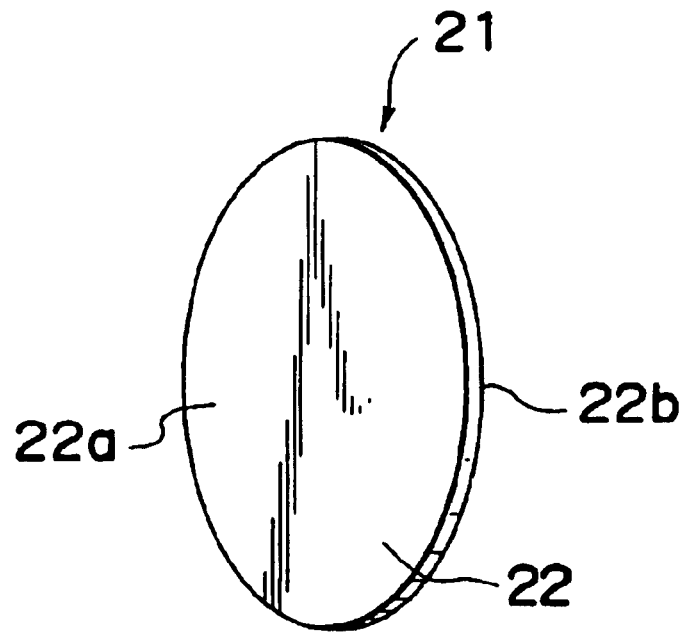
FIG. 3 is a perspective view of an window used in the plasma processing apparatus in connection with a preferred embodiment of the present invention.

FIG. 3 illustrates an observatory window 21 used in a processing chamber of the plasma processing apparatus used for the manufacture of semiconductors, showing a further example of use of the member. The viewing window 21 is in the form of a disc-shaped plate body prepared from the YAG sintered body having the porosity of not higher than 3% and also having opposite surfaces thereof smoothly machined to the center line average roughness Ra of not greater than 0.4 μm. Since the porosity is low and Ra is small, the window surface will hardly be corroded even though exposed to the plasma from a chlorine- or fluorine-containing gas and can therefore provide an excellent transparency for a long period of time and can also prevent the wafer from being contaminated by particles.

The window members may not be always limited to the plate body of the sole YAG sintered body, but may be in the form of a transparent substrate of, for example, glass or sapphire having a surface to which a thin YAG sintered body is applied.

Figure 4:
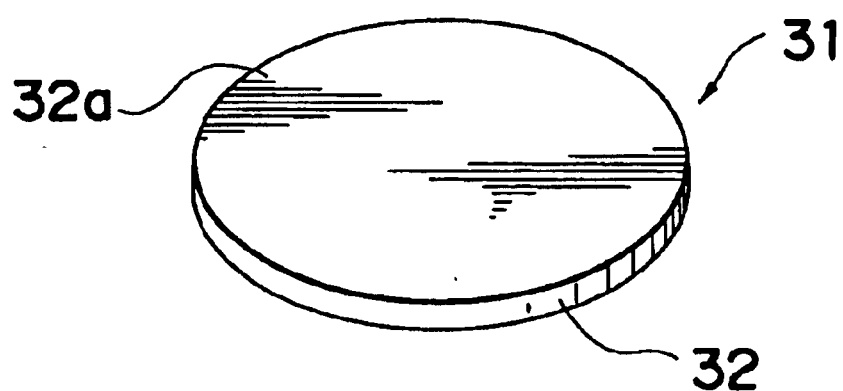
FIG. 4 shows a perspective view of a microwave introducing window member used in the plasma processing apparatus in connection with a preferred embodiment of the present invention.

As a still further example of the plasma-resisting member, FIG. 4 illustrates a microwave introducing window used in the processing chamber of the plasma processing apparatus used for the manufacture of semiconductors. In this example, the microwave introducing window 31 is in the form of a disc-shaped plate body made from the YAG sintered body having the porosity of 3% or less, whose surface on the inside of the processing chamber is smoothly machined to the center line average roughness Ra of 1.0 μm or less.

Since the YAG sintered body has a high resistivity and also has an excellent high frequency characteristic, it is suited for use in a microwave permeable window. Since the surface thereof is smoothed, even though exposed to the plasma within the chlorine or fluorine gas, the window surface will be little corroded, exhibiting a high microwave permeability for a long period of time and is also effective to avoid contamination of the wafer with the particles.

Other than the system described above, the plasma-resistant member of the present invention can also be used for various members used within the processing chamber of the plasma processing apparatus for the manufacture of the semiconductors, for example, inner walls, microwave coupling antennas and members which will contact the plasma of a halogen containing gas.

EXAMPLE 1

The YAG sintered body of the present invention, the alumina sintered body for comparison purpose, the aluminum nitride sintered body for comparison purpose, and sapphire for comparison purpose were tested to determine the corrosion resistance thereof when they are exposed to the plasma within the atmosphere full of a corrosive gas of the halogen system.

In performing the tests, plate samples of 200×200 mm in size, were prepared from the YAG sintered body, the aumina sintered bodies containing alumina in respective purities of 995, 99.9% and 99.99%, the aluminum nitride sintered body and the sapphire with its surface machined to the center line average roughness Ra of 0.8 μm. All of the YAG, alumina and aluminum nitride sintered bodies had the porosity of 3% or less.

Each plate sample was radiated with the plasma for 3 hours at room temperature of 25° C. within the atmosphere full of a $SF_6$ gas and a HCl gas and was corroded so that the corrosion rate was determined from a change in weight of the respective plate sample before and after the test to provide an indication of the halogen-resistant plasma.

Results of the tests are shown in Table 1. In the table, the amount of corrosion is shown in terms of a relative value with that of the alumina sintered body of 99% alumina purity taken as 100.

TABLE 3

| | Material | Amount Etched Off (Relative Value) | |
|---|---|---|---|
| | | $SF_4$ Gas | HCl Gas |
| Reference | Alumina Sintered Body (Alumina Purity: 99%) | 100 | 100 |
| Invention | YAG Sintered Body | 9.6 | 30.4 |
| Comparison | Alumina Sintered Body (Alumina Purity: 99.9%) | 44.4 | 99.8 |
| | Alumina Sintered Body (Alumina Purity: 99.99%) | 43.7 | 79.3 |
| | AlN Sintered Body | 41.5 | 41.5 |
| | Sapphire | 24.1 | 77.4 |

From the results shown above, the YAG sintered body has shown an excellent corrosion resistance to the fluorine and chlorine gases as compared with those of the comparisons.

EXAMPLE 2

Using samples of YAG bodies of varying porosity and varying surface roughnesses, the corrosion resistance exhibited when they are exposed to the plasma within the corrosive atmosphere full of the halogen gas was examined.

In performing the tests, in a manner similar to that in Example 1, the samples were radiated with the plasma for 3 hours at room temperature of 25° C. within the atmosphere full of a $SF_6$ gas and a HCl gas and were corroded so that the corrosion rate was determined from a change in weight of the respective plate sample before and after the test to provide an indication of the plasma-resistance.

In the tests, the corrosion rate is determined in terms of a relative value with that of the YAG sintered body of 0% in porosity and 0.03 μm in Ra taken as 1.

TABLE 4

| | YAG Sintered Body | | | |
|---|---|---|---|---|
| No. | Porosity (%) | Surface Roughness Ra (μm) | Amount Etched (Relative Value) $SF_4$ Gas | Amount Etched (Relative Value) HCl Gas |
| + | | 0.03 | 1.00 | 1.00 |
| 1 | 0 | 0.08 | 1.07 | 1.20 |
| 2 | 0 | 0.30 | 1.57 | 1.65 |
| 3 | 0 | 0.08 | 1.14 | 1.13 |
| 4 | 1 | 1.00 | 1.71 | 1.60 |
| 5 | 2 | 0.25 | 1.64 | 1.67 |
| 6* | 3 | 1.10 | 2.50 | 2.20 |
| 7* | 4 | 1.41 | 2.93 | 2.67 |
| 8* | 5 | 1.50 | 3.50 | 3.47 |
| 9* | 6 | 1.20 | 3.36 | 3.00 |

+Reference sample.
*Not included within the present invention.

Results of the tests are shown in Table 4. From these results, corrosion of a magnitude double or larger than that exhibited by the reference sample has been confirmed in each of Samples 6 to 9 wherein the center line average surface roughness Ra of the YAG sintered body is greater than 1 μm. In contrast thereto, each of Samples 1 to 5 wherein the center line average surface roughness Ra is not greater than 1 μm has exhibited corrosion of a magnitude merely about 1.7 times that exhibited by the reference sample.

If the porosity is not higher than 3% and the center line average surface roughness Ra is not greater than 1 μm, a high corrosion resistance to the plasma of a fluorine or chlorine gas can be obtained.

EXAMPLE 3

Preparing samples in different amounts of the oxide of the metal (alkaline earth metal) of Group IIa of Periodic Table and different amounts of impurities of silica ($SiO_2$) were employed in the YAG body, tests of exposing to the plasma within the atmosphere full of the halogen gas were conducted.

In performing the tests, the samples having the porosity of 0% and the center line average surface roughness Ra of 0.8 μm with respective contents of MgO, CaO and $SiO_2$ being changed were radiated with the plasma for 4 hours within the atmosphere of a $SF_6$ gas and a HCl gas and were corroded so that the amount of corrosion before and after the test was examined. The corrosion rate was determined from change in amount of corrosion. The sample containing substantially no impurity was taken as a reference sample and is chosen to be 1, and relative values are calculated.

Results of the tests are shown in Table 5 and Table 6.

TABLE 5

| | Impurity Amount in YAG Sintered Body (ppm) | | | | Amount Etched Off (Relative Value) |
|---|---|---|---|---|---|
| No. | MgO | CaO | $SiO_2$ | Total | $SF_6$ Gas |
| + | 0 | 0 | 0 | 0 | 1.00 |
| 1 | 500 | 0 | 700 | 1,200 | 1.14 |
| 2 | 500 | 100 | 700 | 1,300 | 1.71 |
| 3 | 200 | 200 | 600 | 1,000 | 1.07 |
| 4 | 1,000 | 200 | 200 | 1,400 | 1.39 |
| 5 | 500 | 200 | 800 | 1,500 | 1.57 |
| 6 | 300 | 500 | 600 | 1,400 | 1.81 |
| 7* | 500 | 300 | 1,000 | 1,800 | 3.50 |
| 8* | 700 | 100 | 1,000 | 1,800 | 2.50 |
| 9* | 400 | 700 | 700 | 1,800 | 2.34 |

+Reference example.
*Not included within the present invention.

TABLE 6

| | Impurity Amount in YAG Sintered Body (ppm) | | | | Amount Etched (Relative Value) |
|---|---|---|---|---|---|
| No. | MgO | CaO | $SiO_2$ | Total | HCl Gas |
| + | 0 | 0 | 0 | 0 | 1.00 |
| 1 | 0 | 0 | 900 | 900 | 1.33 |
| 2 | 500 | 0 | 700 | 1,200 | 1.31 |
| 3 | 500 | 200 | 800 | 1,500 | 1.67 |
| 4 | 200 | 200 | 600 | 1,000 | 1.27 |
| 5 | 300 | 200 | 900 | 1,400 | 1.60 |
| 6 | 700 | 600 | 200 | 1,500 | 1.88 |
| 7* | 500 | 300 | 1,000 | 1,800 | 3.47 |
| 8* | 700 | 100 | 1,000 | 1,800 | 2.20 |
| 9* | 400 | 900 | 800 | 2,100 | 3.51 |

+Reference sample.
*Not included within the present invention.

From these results, Samples 7 to 9 were found that corrosion took place as a result of reaction of the impurities with the plasma in the presence of the $SF_6$ gas and the HCl gas because they contained the impurities in a total quantity exceeding 0.15%. However, Samples 1 to 6 were found that corrosion was retarded because the total amount of the impurities contained therein was not greater than 0.15%.

Embodiment 3

Figure 6:
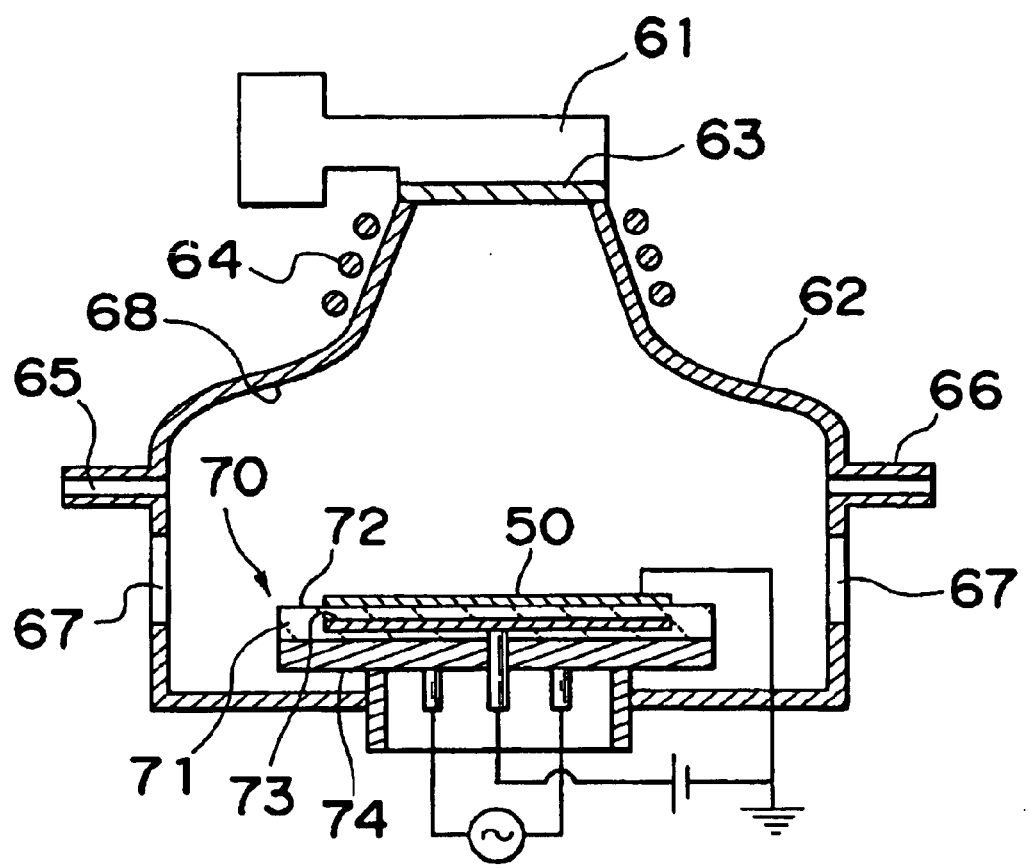
FIG. 6 show a cross-sectional view of a plasma processing apparatus.

In this embodiment of the present invention, a window member for the plasma processing apparatus is dealt with. The window member is provided as a light transmissive window 67 in a portion of a side wall 1 within the plasma processing apparatus such as, for example, shown in FIG. 6. As shown in FIGS. 5A and 5B, the window 67 is fixed within the apparatus with a window member 21 accommodated in a frame 83 that is fixed to the side wall 81(1).

The window member 21 of the present invention is made from the plate-like YAG sintered body having a high light transmissivity. The window member 21 in the manner as shown in FIG. 5A is formed only from the light transmissive YAG sintered body, in which case the thickness thereof is required to be 0.5 to 10.0 mm. This is because if the thickness of the window member formed only from the light transmissive YAG sintered body is thinner than 0.5 mm, it will lack a sufficient mechanical strength for the window member of the plasma processing instrument in which the interior is under a vacuum, failing to sufficiently withstand the stresses brought about by the pressure difference across the window member. Moreover, such a thin window member will bring about difficulty in handling until it is fitted to the frame.

On the other hand, if the thickness is greater than 10 mm, the light transmissivity as the window member will be lower than 50%/mm, resulting in lowering of the light transmission to an extend lower than the practically acceptable value. It is to be noted that in terms of the light transmissivity, if the thickness is smaller than 5.0 mm, the YAG sintered body will exhibit a light transmissivity of higher than 70%/mm and is therefore preferable. Also, in terms of the strength, the thickness is preferred to be greater than 1 mm.

Also, the window member 21 may, as shown in FIG. 5B, be configured in the form of a laminated window plate comprising a known light transmissive substrate 84(4) such as glass having a surface to which a light transmissive YAG sintered body 85 of 0.1 to 10 mm in thickness is bonded. If the thickness is smaller than 0.1 mm, not only will the YAG sintered body 85 to be bonded to this substrate 84 be difficult to machine, but the mechanical strength of the YAG sintered body itself will be insufficient. This will constitute a cause of cracking occurring as a result of a difference in thermal expansion with the light transmissive substrate, which in turn lowers the light transmissivity and also results in a loss of the corrosion resistance. On the other hand, if the thickness is greater than 10 mm, the light transmissivity will be lowered such that it will no longer be practically usable. In terms of the light transmissivity, it is preferred that the YAG sintered body 85 have a thickness smaller than 5.0 mm in order to retain the light transmissivity of 70%/mm or higher.

On the other hand, the light transmissive substrate 4 may be made of such a known window material as, for example, glass, quarts, sapphire, or a light transmissive ceramic material. The light transmissive substrate preferably has a light transmissivity of 70%/mm with respect to visible rays.

The YAG sintered body used for the window member comprises, as a principal component, crystal of the composite metal oxide prepared by compounding $Y_2O_3$ and $Al_2O_3$ in a mole ratio of 3:5, and the light transmissivity of this light transmissive YAG sintered body is preferably higher than 50%/mm and, in particular, higher than 70%/mm.

The light transmissive YAG sintered body of the present invention can be prepared in the following manner, powders of Yttria $Y_2O_3$ in a purity of 99.7% or more and alumina $Al_2O_3$ in a purity of 99.7% or more are mixed together in a mole ratio of 3:5 and subsequently calcinated to provide a YAG compound which is then pulverized to provide a powder of YAG raw material having an average grain size not greater than 2 $\mu$m.

Thereafter, this YAG raw material is added with a predetermined solvent and then pulverized and mixed by a rotary mill or the like to provide granules. The resulting granular YAG material is formed into the predetermined shape of compacts by the use of a press or a cold isostatic press to provide a compact bodies which is subsequently densified by firing at 1,600 to 1,900° C. in the reducing atmosphere rich of hydrogen, nitrogen or the like under the vacuum. By mirror-polishing a surface of the resultant sintered body, a transparent sintered plate can be obtained.

The sintered body so prepared preferably has a porosity of 3% or less and, in particular, 1% or less, the surface roughness Ra of an exposed surface thereof being preferably 1.0 $\mu$m or less, more preferably 0.5 $\mu$M or less and, in particular, 0.3 $\mu$m or less. If the porosity is higher than 3% and/or the surface roughness is greater than 0.5 $\mu$m, the linear light transmissivity of the YAG sintered body will be lowered accompanied by reduction in transparency and see-through capability. Also, the resistance to the halogen plasma which is a prominent feature of the YAG sintered body as compared with other materials will be adversely affected by increase of the porosity and deterioration of the surface roughness.

Also, as shown in FIG. 5B, the laminated window plate of the present invention can be fabricated by bonding the YAG sintered plate so prepared as described above and having the predetermined thickness, to the surface of the separately prepared light transmissive substrate. The YAG sintered plate is bonded to that surface of the substrate which is positioned on the inner wall of the plasma processing apparatus, and a bonding method in which the resistance of the sintered body to the plasma is utilized may include the use of a light transmissive heat-resistant bonding agent or the like.

The light transmissive substrate may have any suitable thickness provided that as a member to be bonded to the YAG sintered body the light transmissive substrate can exhibit a sufficient durability even placed in a condition in which stresses resulting from the pressure difference between the atmosphere and the interior may act thereon. In particular, the thickness of the window member as a whole is preferably 0.5 mm or less.

Also, the window member generally has a plate shape, but the window member having a curved surface can be formed by a pressing or machining method.

EXAMPLE 1

In order to examine a change in corrosion resistance and light transmissivity of the window member made of the light transmissive YAG sintered body when the window member is exposed to various plasmas, tests were conducted using the highly chemically corrosive halogen plasma and an Ar plasma having a physically high sputtering power.

The light transmissive YAG sintered body was prepared in the following manner.

For alumina, a powder of $Al_2O_3$ having a purity of 99.8%, a BET specific surface area of 4 $m^2/g$ and an average grain size of 0.4 $\mu$m was chosen. For yttria, a powder of $Y_2O_3$ having a purity of 99.8%, a BET specific surface area of 5 $m^2/g$ and an average grain size of 1 $\mu$m was chosen. The alumina and yttria powders were mixed together in a mole ratio of $Al_2O_3:Y_2O_3=5:3$. After the powdery mixture was calcinated at 1350° C., the resultant mixture was again pulverized to a powder which was subsequently pressed by a die press method into a pressed compact having a density of 2.5 g/cm$^3$ or more. This compact was fired for 15 hours at 1750° C. within a tungsten heater furnace to provide the YAG sintered body having a relative density of 99.5%. Thereafter, the sintered body was mirror-polished to have a surface having a center line average roughness Ra of not greater than 0.5 $\mu$m and the YAG sintered disc of 25 mm in diameter and 3 mm in thickness was obtained to be used as the window plate.

For comparison purpose, single crystal quartz, sapphire, a light transmissive alumina sintered body, a light transmissive aluminum nitride sintered body and so on were prepared and were tested as to change in their corrosive resistance, surface configiration, and light transmissivity.

The plasma radiating condition is as follows. For the halogen containing gas, $SF_6$ gas as a fluorine and a $Cl_2$ of chlorine were used. For the plasma radiating apparatus; a reactive ion etching (RIE) device was used. Under the plasma generating condition in which each of the $SF_6$, $Cl_2$ and Ar gases was supplied at a rate of 100 sccm, the chamber interior pressure was set to 10 Pa and the RF output was chosen to be 1 kW, the corrosion tests were conducted.

With respect to the light transmissivity of each samples tested, after each sample has been machined to a predetermined thickness, mirror-polishing was carried to provide the center line average roughness Ra of not greater than 0.5 μm, and the linear light transmissivity of the visible rays of 600 nm in wavelength was measured using an infrared spectrometer. The rate of corrosion was calculated from a change in weight of each sample before, and after the test. The surface condition after plasma radiation were determined with naked eyes and SEM. The light transmissivity after the plasma radiation was measured without any treatment made on the radiated surface after the plasma radiation. Results are shown in Table 7.

tic and the light transmissivity of the light transmissive YAG sintered bodies were examined. Materials used in the test were a light transmissive YAG sintered body having a porosity of not higher than 1%. With respect to the mechanical characteristic, a four-point bending resistance test was carried according to JIS R-1601 by changing the thickness of bending resistance test pieces from 0.1 to 3.0 mm, and the breaking load was then measured. With respect to the light transmissivity, after the samples have been ground to respective thicknesses of 0.1 to 15.0 mm, they were mirror-polished and the linear light transmissivity by visible rays of 600 nm in wavelength was measured using an infrared spectrometer. Results thereof are shown in Table 8.

TABLE 7

| | Window Member | Transmissivity (before Test) (%/mm) | Plasma Gas | Etching Rate (A/min) | Surface Condition | Transmissivity (after Test) (%/mm) | Evaluation |
|---|---|---|---|---|---|---|---|
| *1 | Quartz | 95 | $SF_6$ | 1000 | White hazy | 25 | X |
| *2 | " | 95 | $Cl_2$ | 800 | White hazy | 25 | X |
| *3 | " | 95 | Ar | 50 | White hazy | 40 | X |
| *4 | Sapphire | 95 | $SF_6$ | 35 | Colored | 60 | Δ |
| *5 | " | 95 | $Cl_2$ | 110 | White hazy | 35 | X |
| *6 | " | 95 | Ar | 50 | No change | 70 | Δ |
| *7 | Alumina | 90 | $SF_6$ | 50 | Colored | 55 | Δ |
| *8 | " | 90 | $Cl_2$ | 100 | Hazy | 30 | X |
| *9 | " | 90 | Ar | 40 | No change | 65 | Δ |
| *10 | AlN | 85 | $SF_6$ | 40 | Colored | 55 | Δ |
| *11 | " | 85 | $Cl_2$ | 150 | Hazy | 30 | X |
| *12 | " | 85 | Ar | 50 | Hazy | 40 | X |
| 13 | YAG | 80 | $SF_6$ | 6 | No change | 80 | ○ |
| 14 | " | 80 | $Cl_2$ | 30 | No change | 75 | ○ |
| 15 | " | 80 | Ar | 15 | No change | 75 | ○ |
| 16 | " | 90 | $SF_6$ | 2 | No change | 90 | ○ |
| 17 | " | 90 | $Cl_2$ | 15 | No change | 85 | ○ |
| 18 | " | 90 | Ar | 10 | No change | 85 | |

The sample number with the symbol (*) is out of the claim of the present invention.

Referring to Table 7, evaluating in terms of the rate of corrosion, the YAG sintered body used in each of Samples 13 to 18 has shown a corrosion resistance which is at least five times that exhibited by the quartz and at least three times that exhibited by any one of the sapphire and the other light transmissive sintered bodies, and has also shown such excellent characteristics of no change in the surface condition and a slight change in light transmissivity.

On the other hand, the quartz used in each of the conventional Samples 1 to 3 has shown a hazing appearance on the surface of the plate regardless of the kind of the plasmas, accompanied by a considerable reduction in light transmissivity. Each of the sapphire, light transmissive alumina sintered body and aluminum nitride sintered body used respectively in Samples 4 to 12 has shown a change in surface condition such as coloring, hazing and so on, accompanied by a reduction in light transmissivity relative to halogen plasma, although having shown a durability relative to the physical sputtering. Corrosion of the grain boundary was observed in each of the light transmissive sintered body employed in Samples 7 to 12.

EXAMPLE 2

In order to evaluate the practical applicability of various window members of different thicknesses as a window member, by a method similar to that used in Example 1 of this embodiment, the thickness, the mechanical characteris-

TABLE 8

| Sample Nos. | Sample Thickness (mm) | Light Transmissivity (%) | Breaking Load (kgf) | Evaluation |
|---|---|---|---|---|
| 19* | 0.10 | 100 | Unable to measure | x |
| 20* | 0.15 | 99 | 0.1 | x |
| 21* | 0.30 | 97 | 0.5 | x |
| 22 | 0.50 | 96 | 1.7 | ? |
| 23 | 0.80 | 94 | 2.8 | ? |
| 24 | 1.00 | 90 | 4.0 | o |
| 25 | 1.50 | 87 | 8.0 | o |
| 26 | 2.00 | 83 | 15.0 | o |
| 27 | 2.50 | 80 | 22.0 | o |
| 28 | 3.00 | 76 | 30.0 | o |
| 29 | 5.00 | 70 | | o |
| 30 | 7.50 | 60 | | o |
| 31 | 10.00 | 52 | | o |
| 32* | 11.00 | 49 | | x |
| 33* | 15.00 | 35 | | x |

*Not included within the present invention

As shown in Table 8, it is clear that the sintered plates of a thickness within the range of 0.5 to 10 mm are excellent as far as the light transmissivity and the breakdown strength are concerned. Although Samples No. 19 to 21 having a thickness smaller than 0.5 mm have shown substantially 100%/mm in light transmissivity, the breaking strength was low and there is possibility of being broken, posing a difficulty in handling. Samples 21 to 29 having a thickness of 0.5 to 5.00 mm have shown having a high braking load sufficient to withstand handling and a light transmissivity of not lower than 70%/mm. Samples 29, 30 and 31 can be utilized with no problem although the light transmissivity was reduced to some extent. Samples No. 32 and No. 33 having a thickness exceeding 10.0 mm have shown a light transmissivity lower than 50%/mm and were found having an inferior functionality as a window member.

EXAMPLE 3

The window plate was formed by bonding the light transmissive YAG sintered body to a glass substrate, having a visible light transmissivity of not lower than 95%/mm and also having a thickness of 2 mm, by the use of a transparent resinous bonding agent. The YAG sintered layer so bonded was processed to have a varying thickness of 0.05 to 15.0 mm and also to have a surface mirror-polished to have a center line average roughness Ra of not greater than 0.5 μm. To this YAG surface the Ar plasma was radiated in a manner similar to that in Example 1 of this embodiment to determine how the surface condition and the light transmissivity change.

TABLE 9

| | Sample Thickness (mm) | Light Transmissivity (%) | Observation with Naked Eyes | Evaluation |
|---|---|---|---|---|
| 34* | 0.05 | 45 | Crack occurred | x |
| 35 | 0.10 | 99 | No change | ○ |
| 36 | 0.30 | 96 | No change | ○ |
| 37 | 0.50 | 95 | No change | ○ |
| 38 | 1.00 | 89 | No change | ○ |
| 39 | 3.00 | 75 | No change | ○ |
| 30 | 5.00 | 69 | No change | ○ |
| 41 | 10.00 | 50 | No change | ○ |
| 42* | 15.00 | 30 | No change | x |

*Not included within the present invention

In Table 9, it will readily be understood that the YAG sintered plates of 0.1 to 10 mm in thickness can be utilized as a window member in view of the light transmissivity and no change occurring in the appearance. Sample 34 was accompanied by occurrence of cracking under the influence of thermal stresses developed there due to a difference in thermal expansion with the glass substrate under the influence of heat produced by the Ar sputtering because of the YAG sintered body had too small a thickness. For this reason, the light transmissivity was considerably reduced as well. Sample 42 has exhibited a light transmissivity lower than 50%/mm because of the thickness being greater than 10.0 mm and has therefore an inferior functionality as a window member.

As discussed above, the window member for the plasma processing apparatus according to the present invention is excellent in durability relative to the plasma and has a long lifetime with deterioration minimized as compared with the conventional quartz and sapphire materials, if the light transmissive YAG sintered body of the predetermined thickness is used.

Embodiment 4

The corrosion resistance of the magnesia-containing ceramic sintered body in the halogen plasma was tested.

EXAMPLE 1

Samples were prepared by granulating an aqueous slurry of a mixed powder of a composition including 30% MgO and 70% $Al_2O_3$ with the use of a spray dryer, then pressing the powder into cylindrical columns with the use of a die press, and firing at 1,700° C. for two hours to provide the sintered body having crystalline phases of MgO and $MgAl_2O_4$. As conventional materials, a quartz glass and an alumina sintered body of 99.5% in purity were used.

Those samples were tested as to the corrosion rate by mirror-polishing the sintered body of 30 mm in diameter and 3 mm in thickness, and then exposing to the plasma of $SF_6$ and $Cl_2$ gases within the RIE plasma apparatus. Results of the test are shown in Table 10.

TABLE 10

| | Material of Corrosion-resistant Member | Bulk Specific Gravity | Porosity (%) | Crystalline Particle Size (μm) | Etching Rate (Å/min) | |
|---|---|---|---|---|---|---|
| | | | | | $SF_6$ Gas | $Cl_2$ Gas |
| The Invention | $MgAl_2O_4$ + MgO (MgO: 50 mmol %, $Al_2O_3$: 50 mmol %) | 3.5 | 0 | 20 | 10 | 20 |
| Comparative Example | $Al_2O_3$ (Purity 99.5%) | 3.9 | 0 | 20 | 100 | 200 |
| | $Al_2O_3$ (Purity 99.9%) | 3.9 | 0 | 10 | 50 | 150 |
| | Quartz glass | 2.2 | 0 | — | 1000 | 1000 |

Table 10 makes it clear that the magnesia-containing ceramic sintered body of the present invention has exhibited the extremely low corrosion rate with respect to any of the $SF_6$ and $Cl_2$ gases.

EXAMPLE 2

In the next pace, samples prepared by different combinations of the crystalline phases of MgO, $MgAl_2O_4$ and $Al_2O_3$ with the mixing proportion varied were tested to determine the relation between the corrosion resistance and the crystalline structure.

The samples were prepared according to respective compositions shown in Table 11 in a manner similar to that in Example 1 in Embodiment 4 and, similarly, the sintered body of 30 mm in outer diameter and 3 mm in thickness and mirror-polished was exposed to the plasma of the $SF_6$ and $Cl_2$ gases for 3 hours to compare the corrosion rates. Results of the tests are shown in Table 1.

TABLE 11

| | Composition of Ceramic Sintered Body | | Crystalline Phase of Ceramic Sintered Body | Bulk Specific Gravity | Porosity (%) | Crystalline Particle Size (μm) | Etching Rate (Å/min) | |
|---|---|---|---|---|---|---|---|---|
| No. | Weight % | Weight % | | | | | $SF_6$ Gas | $Cl_2$ Gas |
| 1 | 100 | 0 | MgO | 3.5 | 0 | 15 | 10 | 10 |
| 2 | 70 | 30 | $MgAl_2O_4$ + MgO | 3.5 | 0 | 20 | 10 | 10 |

TABLE 11-continued

| No. | Composition of Ceramic Sintered Body Weight % | Weight % | Crystalline Phase of Ceramic Sintered Body | Bulk Specific Gravity | Porosity (%) | Crystal-line Particle Size (μm) | Etching Rate (Å/min) SF$_6$ Gas | Cl$_2$ Gas |
|---|---|---|---|---|---|---|---|---|
| 3 | 50 | 50 | MgAl$_2$O$_4$ + MgO | 3.5 | 0 | 15 | 10 | 10 |
| 4 | 40 | 60 | MgAl$_2$O$_4$ + MgO | 3.5 | 0 | 15 | 10 | 10 |
| 5 | 30 | 70 | MgAl$_2$O$_4$ + MgO | 3.5 | 0 | 20 | 10 | 20 |
| 6 | 25 | 75 | MgAl$_2$O$_4$ + Al$_2$O$_3$ | 3.5 | 0 | 10 | 30 | 50 |
| 7 | 20 | 80 | MgAl$_2$O$_4$ + Al$_2$O$_3$ | 3.6 | 0 | 15 | 30 | 50 |
| 8 | 15 | 85 | MgAl$_2$O$_4$ + Al$_2$O$_3$ | 3.6 | 0 | 15 | 30 | 50 |
| *9 | 10 | 90 | MgAl$_2$O$_4$ + Al$_2$O$_3$ | 3.7 | 0 | 11 | 70 | 120 |

The sample number with the symbol (*) is out of the claim of the present invention.

From Table 11, it will readily be seen that the sintered body containing MgO in an amount of 15% or more has exhibited a low corrosion rate of 30 angstrom/min against SF$_6$ and 50 angstrom/min against Cl$_2$ gas and exhibited an excellent corrosion resistance to any other plasma. In particular, the content of MgO in a quantity not smaller than 50% has resulted in not higher than 20 angstrom/min, and specifically, the ceramics containing 100% MgO has attained a considerably low corrosion rate of 5 angstrom/min to both of the gases.

EXAMPLE 3

Using the ceramic sintered body sample No. 3 (containing 50% MgO) shown in Table 11, the corrosion rate was compared by changing the baking temperature, controlling the porosity and the crystal grain size and exposing for three hours to the plasma of SF$_6$ and Cl$_2$ gases. The porosity, the crystal grain size and the corrosion speed after the baking are shown in Table 12.

TABLE 12

| No. | Composition of Ceramic Sintered Body Weight % | Weight % | Crystalline Phase of Ceramic Sintered Body | Bulk Specific Gravity | Porosity (%) | Crystal-line Particle Size (μm) | Etching Rate (Å/min) SF$_6$ Gas | Cl$_2$ Gas |
|---|---|---|---|---|---|---|---|---|
| *A | 30 | 70 | MgAl$_2$O$_4$ + MgO | 3.5 | 3.5 | 2 | 500 | 450 |
| *B | | | | 3.4 | 1.0 | 3 | 300 | 300 |
| C | | | | 3.5 | 0.2 | 3 | 30 | 50 |
| D | | | | 3.5 | 0.1 | 15 | 10 | 10 |
| E | | | | 3.5 | 0 | 20 | 10 | 20 |
| F | | | | 3.5 | 0 | 30 | 10 | 20 |

From Table 12, Samples C to F in which the porosity is 0.2% or less exhibited low corrosion rates of 30 angstrom/min to SF$_6$ and 50 angstrom/min to the Cl$_2$ gas. It is readily seen that those samples have large crystal grain sizes and, which in particular, contributes to the low corrosion rate.

In contrast thereto, Samples A and B have a high porosity of 0.2% or more and small average grain sizes and were, therefore, susceptible to corrosion under the influence of the plasma, with the corrosion rate increased.

What is claimed is:

1. A member having a resistance to a halogen plasma, which is exposed to a halogen gas and the plasma, wherein the member comprises an yttrium.aluminum.garnet sintered body, said sintered body having a porosity of 3% or less and also having a surface of 1 μm or less in center line average roughness Ra.

2. A member according to claim 1, wherein the member has a surface to be exposed to the halogen containing gas and its plasma, only said surface comprises a sintered layer of yttrium-aluminum-garnet formed thereon.

3. A member according to claim 1 or 2, wherein an amount of the impurity metals of Group IIa of Periodic Table contained in the sintered body is 0.15 wt % or less in total.

4. A member according to claim 1 or 2, wherein the member is an electrostatic chuck for support of a semiconductor wafer.

5. A member according to claim 1 or 2, wherein the member is a susceptor for support of a semiconductor wafer or a clamp member for retaining a peripheral edge portion of a semiconductor wafer.

6. A member according to claim 1 or 2, wherein the member is a microwave introducing window.

7. A member according to claim 1 or 2, wherein the member is any one of the members of an inner wall, a gas nozzle, a support ring and a liner material in a processing chamber.

8. A member according to claim 1 or 2, wherein the member is a discharge lamp tube of a metal halide lamp.

9. A window member for a plasma processing apparatus, which has one surfaces to be exposed to a halogen plasma, wherein the window member comprises a light transmissive substrate and a light transmissive yttrium-aluminum-garnet sintered body of 0.1 to 10.0 mm in thickness bonded to the substrate on at least said aide to be exposed to the plasma.

10. A member having a resistance to a halogen plasma which is exposed to a halogen containing gas and its plasma, said member comprising a ceramic sintered body containing, on oxide basis, MgO in an amount of 15 wt % or more and alumina in an amount of 85 wt % or less in the terms of oxides and including any one of a single phase of MgO, mixed phases of $MgAl_2O_4$ and MgO, a single phase of $MgAl_2O_4$ and mixed phase of $MgAl_2O_4$ and $Al_2O_3$, wherein the ceramic sintered body has a crystalline phase having an average crystal grain size of 3 μm or more and also having a porosity of 0.2% or less.

11. A member according to 10, wherein the member is a susceptor for support of a semiconductor wafer or a clamp member for retaining a peripheral edge portion of a semiconductor wafer.

12. A member according to 10, wherein the member is one of an inner wall member, a gas nozzle, a, support ring and a liner material in a processing chamber.

13. A member having a resistance to a halogen plasma which is exposed to a halogen containing gas and its plasma, said member comprising a ceramic sintered body containing, on oxide basis, MgO in an amount of 15 wt % or more and alumina in an amount of 85 wt % or less in the terms of oxides and including any one of a single phase of MgO, mixed phases of $MgAl_2O_4$ and MgO, a single phase of $MgAl_2O_4$ and mixed phases of $MgAl_2O_4$ and $Al_2O_3$, wherein the member is a susceptor for support of a semiconductor wafer or a clamp member for retaining a peripheral edge portion of a semiconductor wafer.

14. A member having a resistance to a halogen plasma which is exposed to a halogen containing gas and its plasma, said member comprising a ceramic sintered body containing, on oxide basis, MgO in an amount of 15 wt % or more and alumina in an amount of 85 wt % or less in the terms of oxides and including any one of a single phase of MgO, mixed phases of $MgAl_2O_4$ and MgO, a single phase of $MgAl_2O_4$ and mixed phases of $MgAl_2O_4$ and $Al_2O_3$, wherein the member is one of a gas nozzle, a support ring and a liner material in a processing chamber.

* * * * *